United States Patent [19]

Scully

[11] Patent Number: 4,737,055
[45] Date of Patent: Apr. 12, 1988

[54] ATTACHMENT FITTING

[75] Inventor: Andrew J. Scully, Macomb, Mich.

[73] Assignee: The United States of America as represented by the Secretary of the Army, Washington, D.C.

[21] Appl. No.: 9,310

[22] Filed: Jan. 30, 1987

[51] Int. Cl.$^4$ ............................................... B60P 7/13
[52] U.S. Cl. ....................................... 410/76; 410/91; 296/35.3; 114/75
[58] Field of Search ............... 410/52, 73, 76, 81, 410/82, 90, 91; 114/75; 296/35.3; 280/415 B, DIG. 8

[56] References Cited

U.S. PATENT DOCUMENTS

| | | | |
|---|---|---|---|
| 1,772,939 | 8/1930 | Fitch | 410/91 |
| 3,584,824 | 6/1971 | Belcer | 410/82 |
| 4,076,434 | 2/1978 | Sperner | 410/91 |
| 4,339,148 | 7/1982 | Smith et al. | 410/76 |
| 4,394,101 | 7/1983 | Richer | 410/76 |

Primary Examiner—Joseph F. Peters, Jr.
Assistant Examiner—Stephen P. Avila
Attorney, Agent, or Firm—Peter A. Taucher; Gail S. Soderling

[57] ABSTRACT

In association with a vehicle designed to carry a heavy load module, an improved means for accurately guiding the module onto the vehicle bed surface as the module is being lowered into position. The improved guide comprises a plural number of specially formed nuts carried on the studs that are used to fasten the module to the bed surface. Each specially formed nut has a conical external surface that acts to center the module fastener holes relative to the axis of each associated stud. The improved guide provides a low cost mechanism for facilitating the quick alignment of a heavy cumbersome load module during the process of lowering the module onto a vehicle bed surface.

7 Claims, 1 Drawing Sheet

ATTACHMENT FITTING

GOVERNMENT INTEREST

The invention described herein may be manufactured, used, and licensed by or for the Government for governmental purposes without payment to me of any royalty thereon.

BACKGROUND AND SUMMARY OF THE INVENTION

Military vehicles are sometimes required to carry and/or transport heavy load modules (in excess of one ton). The term "load module" is used herein to refer to a variety of different devices, e.g. a freight container, portable shelter, missile launcher unit, personnel compartment, communications module, fuel storage unit, ammunition carrier, etc.

The load module must be securely fastened to the vehicle bed surface to prevent damage to the load or to the vehicle. In a typical situation the load-fastener mechanism comprises a plural number of threaded studs projecting upwardly from the vehicle bed surface through holes in a lower wall of the load module; a nut is threaded onto the upper end of each stud to prevent the module from being lifted off the studs.

Since these load modules are relatively heavy they must usually be lifted on or off the vehicle by power mechanisms (e.g. crane or forklift), or by the cooperative efforts of several men. The lifting-lowering operations must be carried out so that the holes in the module lower wall are vertically aligned with the studs on the vehicle bed surface. This is sometimes difficult to accomplish, especially if the load module is extremely heavy or an awkward shape to control (manipulate).

The present invention is directed to a threaded stud construction having a cam-type guide means thereon. The guide means comprises a specially-formed nut (or cap) having a convergent (conical) surface that acts to center the module wall hole on the stud axis (while the load module is being lowered onto the vehicle bed surface). Use of the guide means lessens the time required to correctly align and fasten the module on the vehicle bed surface.

Objects of the invention are to provide a stud-type module fastener means wherein:

1. the module attachment holes are quickly and easily aligned with the studs,
2. the studs are prevented from breakage or bending during the module-attachment operation.
3. the studs have low-cost detachable guides thereon for centering the module attachment holes on the studs, and
4. the centering guides take up minimum space on the studs.

THE DRAWINGS

Figure 1:
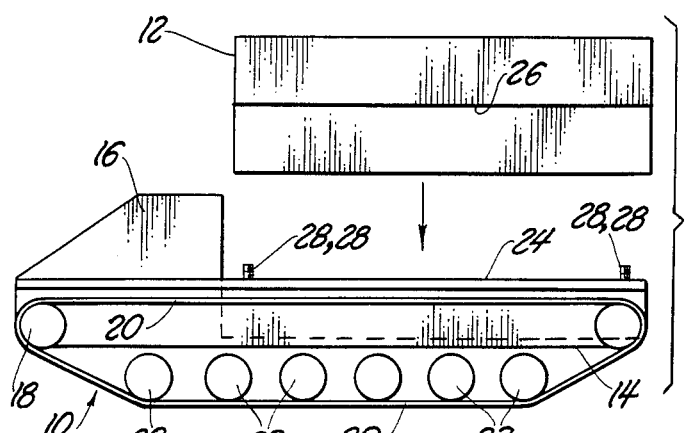
FIG. 1 is a side elevational view of a vehicle and load module having stud-type means for fastening the module on the vehicle. The load module is shown detached from the vehicle.
Figure 2:
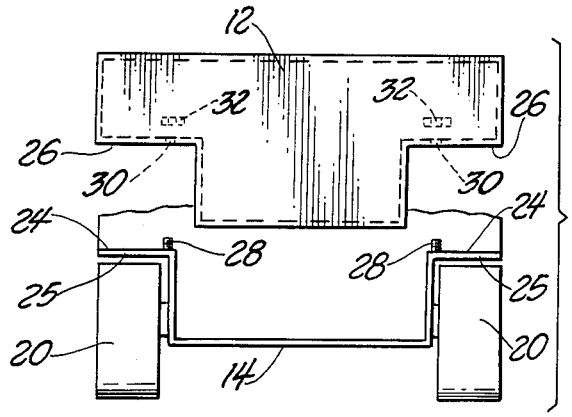
FIG. 2 is a rear end elevational view of the vehicle-load module assembly shown in FIG. 1.

Referring in greater detail to FIGS. 1 and 2, there is shown a vehicle 10 and a load module 12. In this case the vehicle is a tracked military vehicle comprising a hull or body 14 having a cab 16 for the driver and crew. The propulsion unit (engine plus transmission) is located in the front of the vehicle to drive sprocket wheels 18. Endless propulsion tracks 20 are trained around the sprocket wheels and road wheels 22.

The vehicle area behind cab 16 defines two horizontal bed surfaces 24 designed to receive thereon the lower walls 26 of load module 12. Near the front and rear ends of bed surfaces 24 there are upstanding studs 28. Each stud is in potential vertical alignment with a circular hole 30 in the lower wall 26 of the load module 12, such that when the module is correctly positioned and lowered onto the vehicle bed surfaces 24 the studs will project through holes 30. Nuts 32 are screwable onto the upper ends of studs 28 to prevent undesired lift-off of module 12 from the vehicle.

Load module 12 may be constructed differently, depending on its end function and the vehicle configuration. For example, the load module may be a radar enclosure, cargo carrier, missile launcher, water tank, or personnel compartment, etc. It may be detachable from the vehicle for different reasons, depending on the purposes to be served. In general, the module is made detachable from the vehicle, either to permit selective vehicle usage with different types of load modules, or to permit the load module to be transported to a specific location and left there while the vehicle is on another mission. Usually the load module is a relatively heavy structure, weighing several hundred pounds.

Vehicle 10 is shown as a self-propelled tracked military vehicle. However it could be a flat-bed trailer or flat bed truck. The invention is not concerned with the detailed construction of the vehicle or load module. Rather, the invention relates to the mechanisms for attaching the load module to the vehicle. As related to the attached drawing, the invention is directed to certain cap structures installable on studs 28 for centering the module attachment holes 30 on the stud axes while the heavy module is being installed on the vehicle. FIGS. 3 through 8 illustrate features of cap (nut) structures embodying my invention.

FIGS. 3 THROUGH 5

Figure 3:
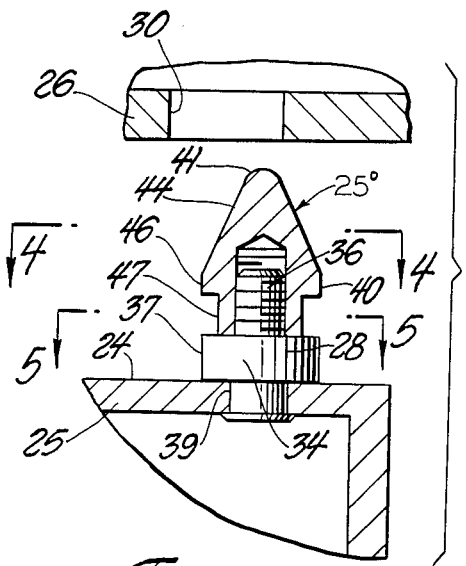
FIG. 3 is a fragmentary sectional view of a stud-type fastener means embodying my invention. The fastener means can be used on the FIG. 1 vehicle.
Figure 4:
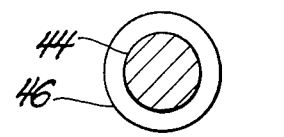
FIG. 4 is a fragmentary sectional view on line 4—4 in FIG. 3.
Figure 5:
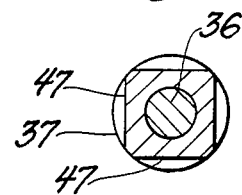
FIG. 5 is a fragmentary sectional view on line 5—5 in FIG. 3.

As seen in FIG. 3, a representative stud 28 comprises a large diameter pilot section 34 of circular cross-section, and a small diameter threaded section 36 projecting upwardly from section 34. The circular side surface 37 of section 34 is dimensioned and smoothly contoured to freely but snugly mate with a circular hole 30 in module wall 26. A shank 39 extends downwardly from pilot section 34 through an opening in vehicle wall 25. Shank 39 may be welded to wall 25 to permanently affix stud 28 to the vehicle.

Detachably mounted on threaded section 36 of the stud is a specially-configured nut or cap 40. Nut 40 has a convergent (pointed) tip or nose 41 at its upper end. Outer annular side surface 44 of the nut is a frusto-conical surface that flares outwardly and downwardly from nose 41 to merge with circular (cylindrical) base 46. Base 46 has the same diameter as pilot portion 37 of stud 28.

The extreme lower end area of nut 40 is cut away (relieved) to form wrench flat surfaces 47. A turning implement (not shown) may be applied to surfaces 47 to turn nut 40 on or off threaded section 36 of the stud 28.

Each of the four studs 28 is equipped with a nut 40 prior to installation of load module 12 onto bed surfaces 24. If holes 30 are slightly out of vertical alignment with studs 28 (as shown in FIG. 3) the frusto-conical surfaces 44 will act as cams or guides to gradually center holes 30 on the stud axis. By the time that holes 30 are in the plane of circular base 46 the holes will be fully aligned with the stud axis.

Load module 12 may be lowered until walls 26 rest on the upper surfaces 24 of vehicle bed walls 25; at that time holes 30 will be in the same plane as stud pilot sections 34. Sections 34 have slip-fit engagements in holes 30 to prevent load module 12 from shifting laterally on the vehicle bed surface.

After the load module has come to rest on bed surface 24 the nuts 40 are unscrewed from threaded sections 36. A washer 48 (FIG. 6) is then placed on each exposed threaded section 36.

FIG. 6 ARRANGEMENT

Figure 6:
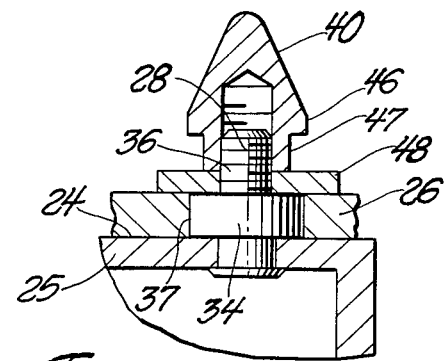
FIG. 6 is a view similar to FIG. 3, but showing the parts in position to fasten the load module on the vehicle bed surface.

FIG. 6 shows the FIG. 3 assembly after placement of washer 48 on threaded section 36, and after nut 40 has been again screwed onto the exposed portion of section 36 (above the plane of washer 48). Thus, nut 40 is unscrewed from threaded section 36 to permit washer 48 to be placed on the upper face of load module wall 26. Nut 40 is re-screwed back onto the exposed portion of threaded section 36 to secure the load module wall 26 in fixed position on the vehicle bed surface 24.

The axial dimension of pilot section 34 is the same as (or preferably slightly less than) the vertical thickness of wall 26. If the vertical dimension of pilot section 34 is slightly less than the thickness of wall 26, washer 48 may be slightly bowed (tensioned) when nut 40 is tightened on threaded section 36, thereby somewhat enhancing the wall hold-down force.

FIG. 6 shows the vehicle-load module fastener system when the module is fully installed on the vehicle, e.g. in the module-transport mode. The module may be detached from the vehicle by loosening nuts 40, removing washers 48, and lifting the module from bed surface 24.

FIGS. 7 AND 8

Figure 7:
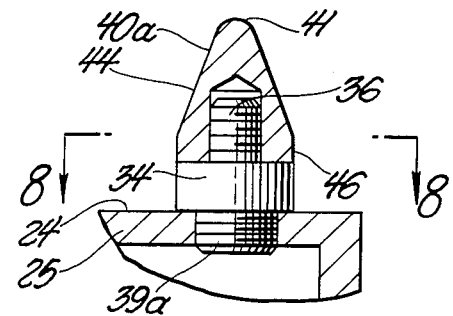
FIG. 7 is a view similar to FIG. 3, but illustrating a variant of my invention.
Figure 8:
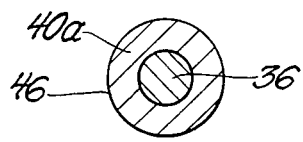
FIG. 8 is a fragmentary sectional view on line 8—8 in FIG. 7.

FIGS. 7 and 8 illustrate a variant of the invention wherein nut 40a is similar to nut 40 (FIGS. 3 and 6) except that it has no wrench flats (47 in FIG. 3). Nut 40a may be screwed on and off of threaded section 36 by hand. In the structure of FIGS. 7 and 8 shank portion 39a of the stud is threaded. The associated hole in wall 25 is tapped to threadably accommodate shank portion 39a. The depicted arrangement permits the stud to be detached from bed wall 25, should it be desired for any reason to make bed surface 24 obstruction-free. Normally the stud will be permanently mounted on the vehicle bed.

With nut 40a screwed onto threaded section 36 of the stud the load module 12 can be lowered onto bed surface 24. Frusto-conical surface 44 on nut 40 acts to center the module attachment hole on the stud axis. Nut 40a can then be unscrewed from section 36 to permit placement of a washer on the load module wall (the washer would be the same construction as shown in FIG. 6). With the washer in place on the upper face of load module wall 24 a conventional nut (not shown) can be screwed onto the exposed (upper) end of threaded section 36 to provide a module hold-down force. The conventional nut performs the function of nut 40 in FIG. 6.

FEATURES OF THE INVENTION

The add-on nut 40 (or 40a) has a frusto-conical side surface 44 that acts to center the module attachment holes 30 on the stud axis while the load module 12 is being lowered onto vehicle bed surface 24. The centering action is such that the module does not have to be precisely oriented relative to the studs prior to being lowered into place. The net effect is a saving in time needed to attach the load module to the vehicle.

Frusto-conical surface 44 on the nut is angled downwardly and outwardly away from the stud axis, to perform the desired hole-centering action. As shown in FIG. 3, surface 44 has an angle of about twenty five degrees relative to the stud axis. It is believed that the angle could be as little as ten degrees or as much as thirty degrees, without adversely affecting the centering action.

The add-on nut serves as a protector for the threaded portion 36 of stud 28. In event of module side-sway motion the side surface of hole 30 will strike surface 44 of nut 40 rather than the threaded surface on section 36; the threads will be protected against nicks, gouging or squashing as might later produce a thread-stripping action.

Nut 40 (or 40a) also increases the bending strength of threaded section 36 (in that the nut effectively adds to the diameter of section 36). The nut-stud assembly is stiffer than the stud section 36 alone. Should the load module 12 sway in a lateral direction so that the hole 30 surface forcibly strikes nut surface 44, the nut-stud assembly will offer considerable resistance against bending or break-off of stud section 36.

Nut 40 (40a) is quickly (readily) detachable from the associated stud 28 so that usage of the special nut adds little to the time required to install the load module on the vehicle. The nut is a relatively small, low cost, hardware item. This add-on nut is a much lower cost device than the alternative use of separate guide pins that have previously been considered.

Stud 28 is designed to include a relatively large diameter pilot section 34 in the plane of module wall 26 (when the module is in its illustrated FIG. 6 position). Pilot section 34 carries (absorbs) lateral forces imposed on the stud by module 12, allowing the small diameter section 36 to be subjected only to the axial hold-down loads.

I wish it to be understood that I do not desire to be limited to the exact details of construction shown and described for obvious modifications will occur to a person skilled in the art, without departing from the spirit and scope of the appended claims.

I claim:

1. In a vehicle designed to carry a heavy load module on a vehicle bed surface; said bed surface having a plural number of upstanding studs thereon, said load module including a lower wall having a plural number of circular openings therethrough fitting onto said studs to prevent lateral dislocation of the module on the bed surface: the improvement comprising a specially-formed nut screwable onto each stud, each nut having a convergent nose, a circular base, and a flaring side surface extending from the nose to the base; each said base having the same diameter as the associated circular opening in the module lower wall, whereby the associated nut acts to center the associated module opening on the associated stud while the module is being lowered onto the bed surface; each said nut being unscrewable from the associated stud after the module is located on the bed surface; and a washer installable on each stud in overlying relationship to the module lower wall; each stud having a sufficient length as to project above the associated washer, whereby each said nut can be re-screwed onto the associated stud to secure the module on the bed surface.

2. The improvement of claim 1 wherein the side surface of each nut is frusto-conical.

3. The improvement of claim 1 wherein the circular base on each nut has at least two wrench flats formed therein.

4. The improvement of claim 1 wherein each stud comprises a large diameter pilot section immediately above the bed surface, and a small diameter threaded section projecting upwardly from the pilot section; each said pilot section having essentially the same diameter as the associated circular opening in the module lower wall, whereby the module lower wall is prevented from shifting laterally on the bed surface.

5. The improvement of claim 4 wherein each said pilot section has an axial dimension that is approximately the same as the thickness of the module lower wall.

6. The improvement of claim 1 wherein the side surface of each nut is acutely angled to the nut axis at an angle of at least ten degrees and not more than thirty degrees.

7. The improvement of claim 6 wherein the angle is approximately twenty five degrees.

* * * * *